(12) United States Patent
Di Nicolantonio

(10) Patent No.: US 7,596,873 B2
(45) Date of Patent: Oct. 6, 2009

(54) POWERED JIGSAW MACHINE

(75) Inventor: Aldo Di Nicolantonio, Recherswil (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/520,792

(22) PCT Filed: Apr. 30, 2004

(86) PCT No.: PCT/DE2004/000904

§ 371 (c)(1), (2), (4) Date: Jan. 10, 2005

(87) PCT Pub. No.: WO2005/000510

PCT Pub. Date: Jan. 6, 2005

(65) Prior Publication Data

US 2006/0090355 A1 May 4, 2006

(30) Foreign Application Priority Data

Jun. 23, 2003 (DE) ................................ 103 28 061

(51) Int. Cl.
*B23D 49/10* (2006.01)
*B27B 19/02* (2006.01)

(52) U.S. Cl. ........................... 30/393; 83/758; 83/776; 30/392; 30/394

(58) Field of Classification Search ........... 30/392–394, 30/376, 558–559, 776; 83/884, 881, 425.3, 83/62.1, 72, 74, 75, DIG. 1, 771; 483/7
See application file for complete search history.

(56) References Cited

U.S. PATENT DOCUMENTS

| | | | | | |
|---|---|---|---|---|---|
| 2,775,272 | A | * | 12/1956 | Papworth | 30/393 |
| 2,917,088 | A | * | 12/1959 | Papworth | 30/374 |
| 3,280,683 | A | * | 10/1966 | Djurberg | 83/454 |
| 3,374,814 | A | * | 3/1968 | Kaufmann | 83/758 |
| 3,890,708 | A | * | 6/1975 | Bauer | 30/393 |
| 3,991,644 | A | * | 11/1976 | Sugimoto | 83/800 |
| 4,137,632 | A | * | 2/1979 | Pfanzer | 30/393 |
| 4,238,884 | A | * | 12/1980 | Walton, II | 30/393 |
| 4,262,421 | A | * | 4/1981 | Bergler et al. | 30/393 |
| 4,305,318 | A | * | 12/1981 | Stolzer | 83/375 |

(Continued)

FOREIGN PATENT DOCUMENTS

DE 2 303 532 8/1974

(Continued)

*Primary Examiner*—Boyer D. Ashley
*Assistant Examiner*—Laura M. Lee
(74) *Attorney, Agent, or Firm*—Michael J. Striker

(57) ABSTRACT

In a hand-guided, motor-driven compass saw machine (1), having a housing (2) that contains a saw blade (3) that can be moved in the vertical direction by a lifter rod (4), and having an oscillation mechanism that has a roller lever (5), which is contained in the housing so that it can rotate around a horizontal first axis (50) and supports a roller (51) that remains in contact with the saw blade (3) and rotates around a horizontal second axis (55), which oscillation mechanism also has a fork lever (6) that periodically deflects the roller lever (5), an adaptive adjustment of the forward saw progress to the advancing force of the compass saw machine (1) is achieved by virtue of the fact that the oscillation mechanism produces an oscillation of the saw blade (3) as a function of the pressure.

10 Claims, 5 Drawing Sheets

U.S. PATENT DOCUMENTS

| | | | |
|---|---|---|---|
| 4,545,123 A * | 10/1985 | Hartmann | 30/393 |
| 4,628,605 A * | 12/1986 | Clowers | 30/393 |
| 5,063,807 A * | 11/1991 | Abel | 83/647 |
| 5,099,705 A * | 3/1992 | Dravnieks | 74/50 |
| 5,205,043 A * | 4/1993 | Batt et al. | 30/393 |
| 5,644,846 A * | 7/1997 | Durr et al. | 30/393 |
| 5,727,322 A * | 3/1998 | Giacometti | 30/376 |
| 5,819,421 A * | 10/1998 | Giacometti et al. | 30/392 |
| 6,553,675 B2 * | 4/2003 | Orrico | 30/376 |
| 6,701,816 B2 * | 3/2004 | Smith | 83/74 |
| 7,234,243 B2 * | 6/2007 | Tam et al. | 30/393 |
| 2002/0056558 A1 * | 5/2002 | Bongers-Ambrosius et al. | 173/201 |
| 2002/0170186 A1 * | 11/2002 | Sakaguchi | 30/394 |
| 2004/0194986 A1 * | 10/2004 | Ikuta | 173/48 |
| 2005/0109137 A1 * | 5/2005 | Hartmann | 74/25 |

FOREIGN PATENT DOCUMENTS

| | | |
|---|---|---|
| DE | 198 05 675 A1 | 8/1998 |
| GB | 2 322 594 A | 9/1998 |

\* cited by examiner

POWERED JIGSAW MACHINE

CROSS-REFERENCE

The invention described and claimed hereinbelow is also described in PCT/DE 2004/000904 filed on Apr. 30, 2004 and DE 103 28 061.8 filed Jun. 23, 2003. This German Patent Application, whose subject matter is incorporated here by reference, provides the basis for a claim of priority of invention under 35 U.S.C. 119 (a)-(d).

BACKGROUND OF THE INVENTION

The present invention is based on a motor-driven compass saw machine.

A hand-guided, motor-driven compass saw machine with an oscillation mechanism is known from DE 198 06 05 675. This oscillation mechanism deflects the saw blade, which is secured in a lifter rod, in the cutting direction by means of a roller lever. This deflection in the cutting direction, which is referred to as an oscillation stroke, results in a faster forward progress of the saw. The oscillation stroke can be adjusted by means of adjusting knob; discrete adjustments of the deflection can only be selected in steps. A stop that the roller lever strikes against when it is deflected limits the maximum deflection, which is different in each fixed step.

The greater the oscillation is, the faster the cut progresses. But the cutting quality suffers as a result of this because it produces tear-outs at the edges of the cut as well as rough cut surfaces. In addition, cutting control decreases as the cutting speed increases. But switching between the individual oscillation stages by rotating the stop is complicated, as a result of which it is regularly not carried out during sawing. But this really should be done since requirements for cutting processes change frequently. Thus, for straight parts, a rapid cutting speed is preferable, but in tricky, curved passages, or when carefully starting a cut, a slow cutting speed with a higher cutting quality is preferable. Both of the above-mentioned extremes can alternate continuously, thus requiring the user to constantly adjust the oscillation.

SUMMARY OF THE INVENTION

A hand-guided, motor-driven compass saw machine according to the present invention has the advantage over the prior art that the forward saw progress changes automatically by means of an adaptive, automatic oscillation that is a function of the advancing force in the cutting direction.

Preferably, this occurs by means of a spring element that is compressed further as the advancing force, i.e. the cutting speed, increases. This means that when sawing straight parts at a high speed, the spring element is compressed very powerfully and consequently, a large oscillation is produced. However, when sawing tricky, curved passages, only an extremely low advancing force is exerted on the saw blade so that the spring element is hardly compressed at all. This results in only a very slight oscillation of the saw blade. Preferably, the oscillation is also jointly controlled by means of a damping device. The spring forces specified in detail below are understood to be the resultant spring force acting on the roller in the horizontal direction.

The provision of a second stop on the housing, above the roller lever, in the region of its end oriented away from the roller, makes it possible to preset a maximum oscillation. Preferably, the second stop is embodied so that it can be set to various distances from the roller lever by means of an adjusting knob. This makes it possible to set the maximum oscillation in various stages.

The fact that the compass saw machine has a shutoff mechanism, in particular a mechanical device for compressing the spring element, which shutoff mechanism suppresses the parallel component of the spring element, makes it very easy to switch off the automatic oscillation. For example, it is then possible to very easily switch back and forth between an oscillation mechanism known from the prior art and the oscillation mechanism according to the present invention.

BRIEF DESCRIPTION OF THE DRAWINGS

An exemplary embodiment of the invention will be explained in greater detail in the following description in conjunction with the accompanying drawings.

DETAILED DESCRIPTION OF THE PREFERRED EMBODIMENTS

Figure 1:
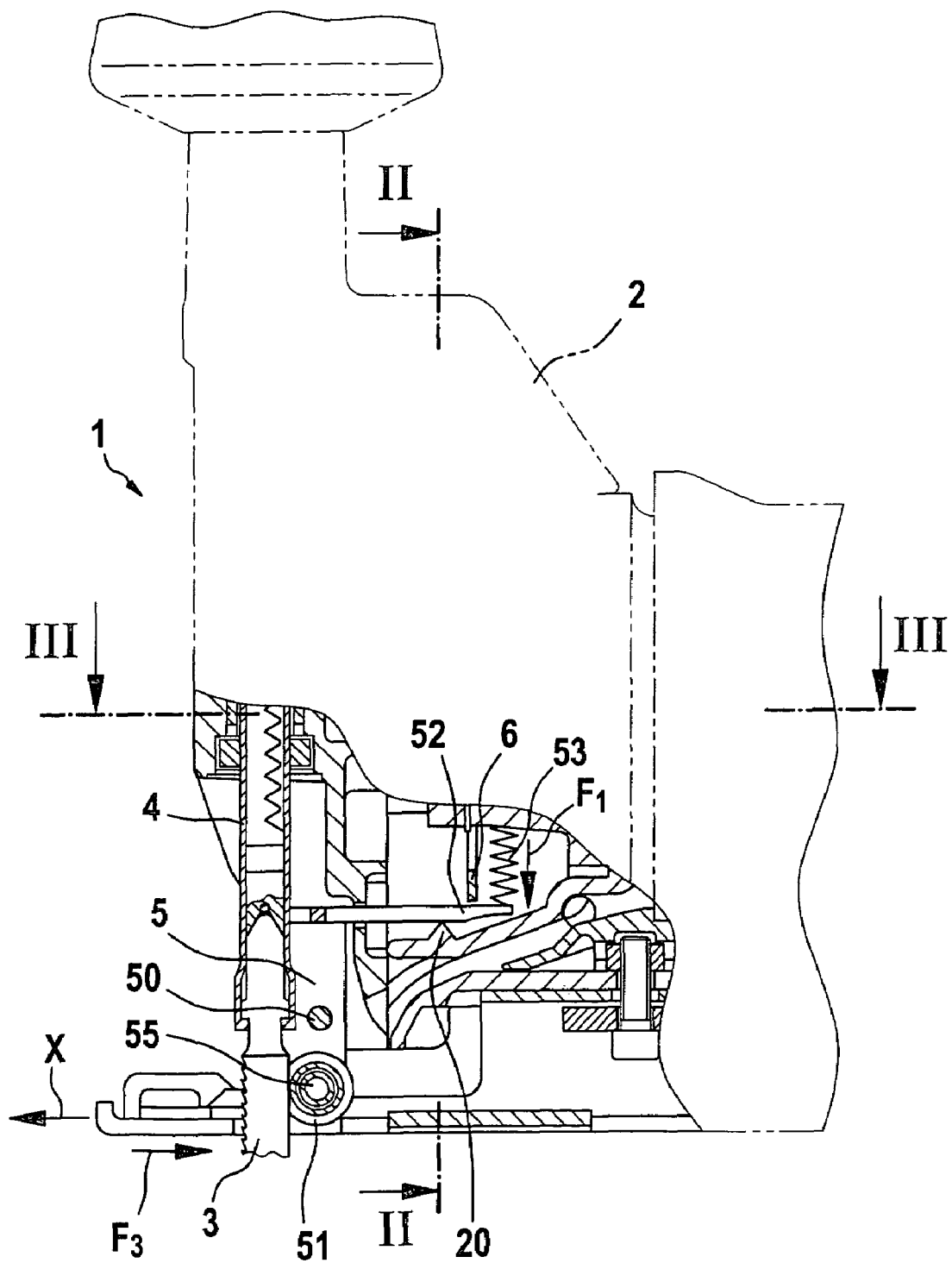
FIG. 1 is a vertical longitudinal section through a compass saw machine according to the present invention.
Figure 2:
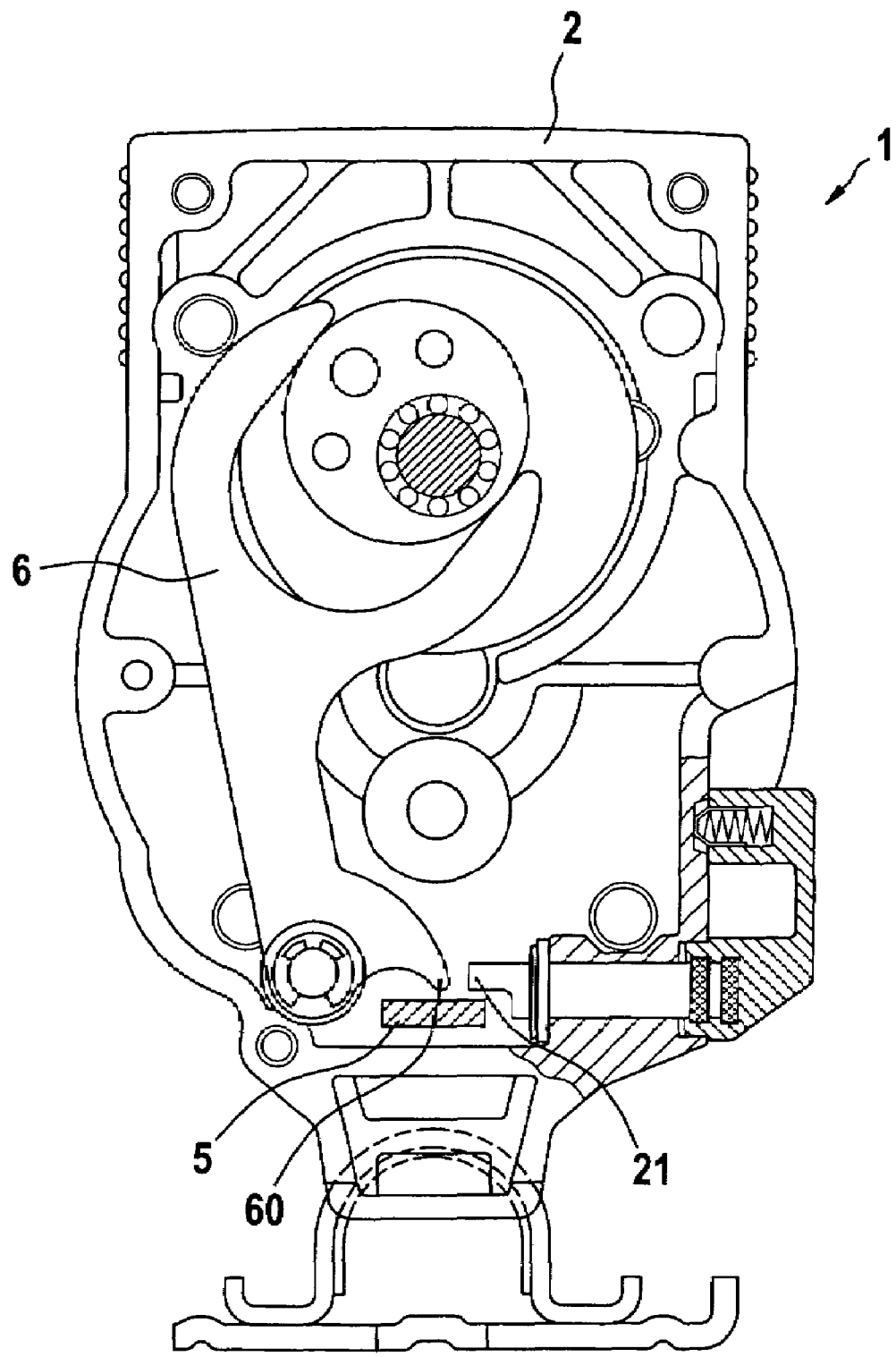
FIG. 2 is a vertical cross section through the compass saw machine according to FIG. 1 in the direction II-II.
Figure 3:
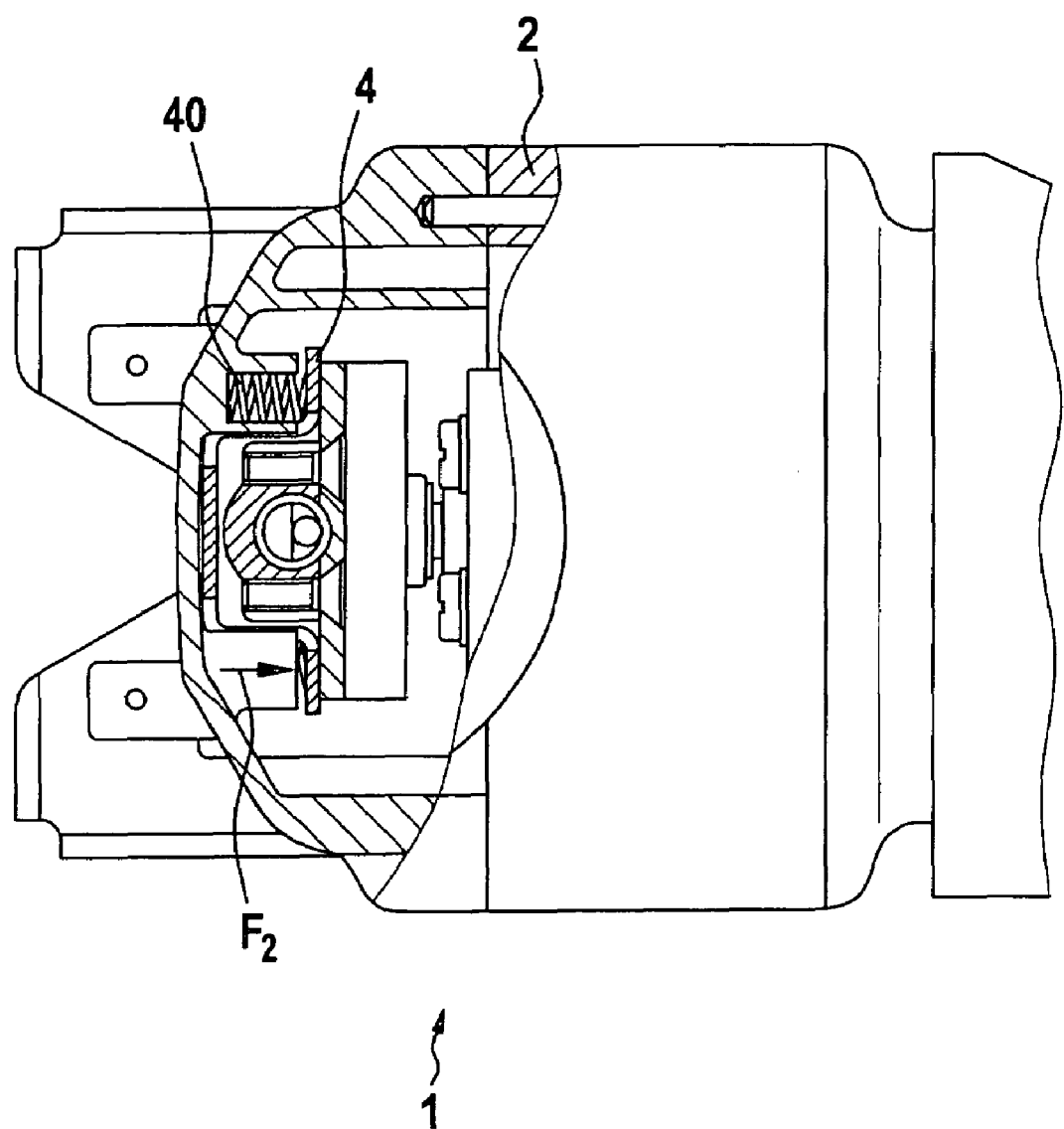
FIG. 3 is a horizontal longitudinal section through the compass saw machine from FIG. 1, along the line III-III.
Figure 4:
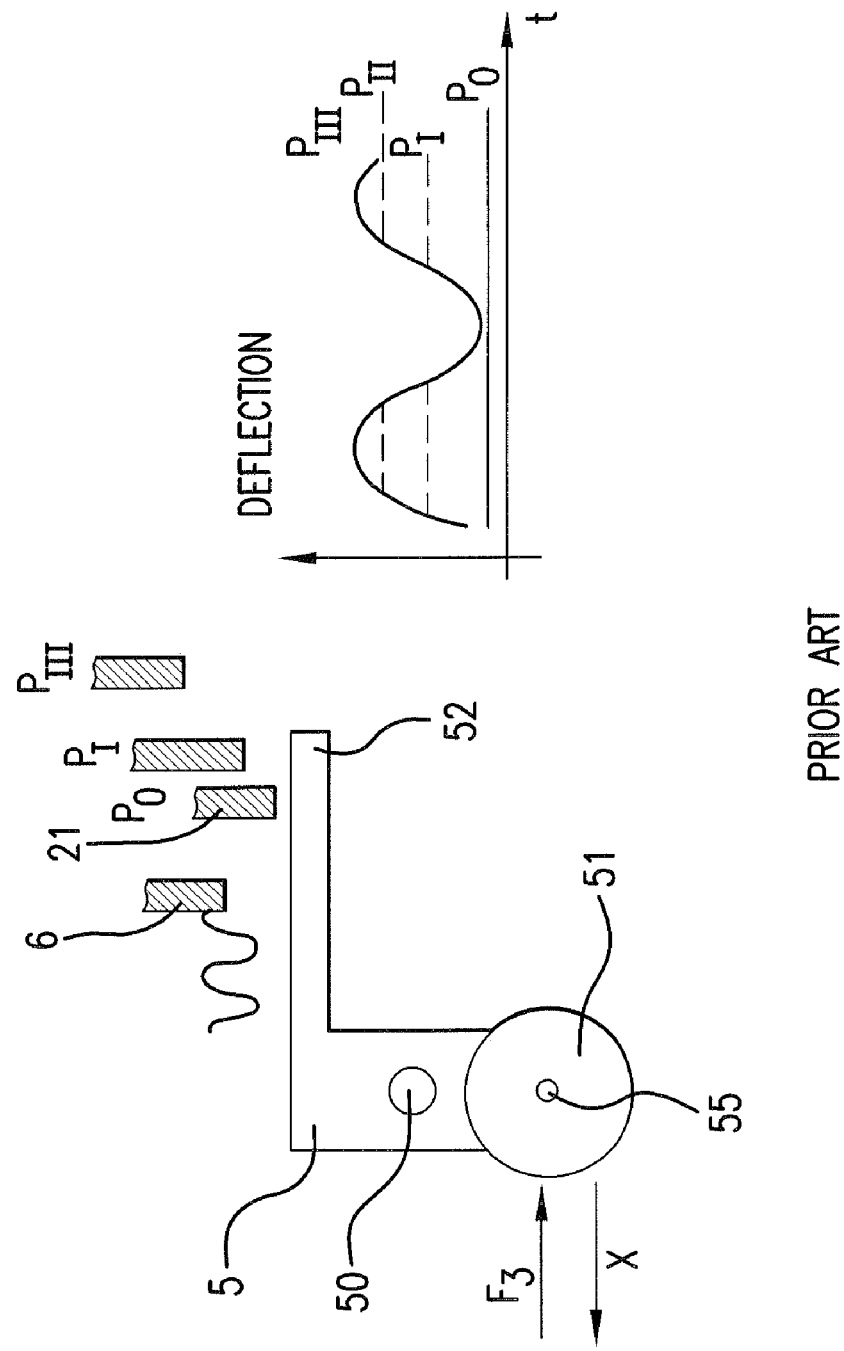
FIG. 4 shows a schematic design for a roller mechanism according to the prior art, with the curve of the deflection over time.
Figure 5:
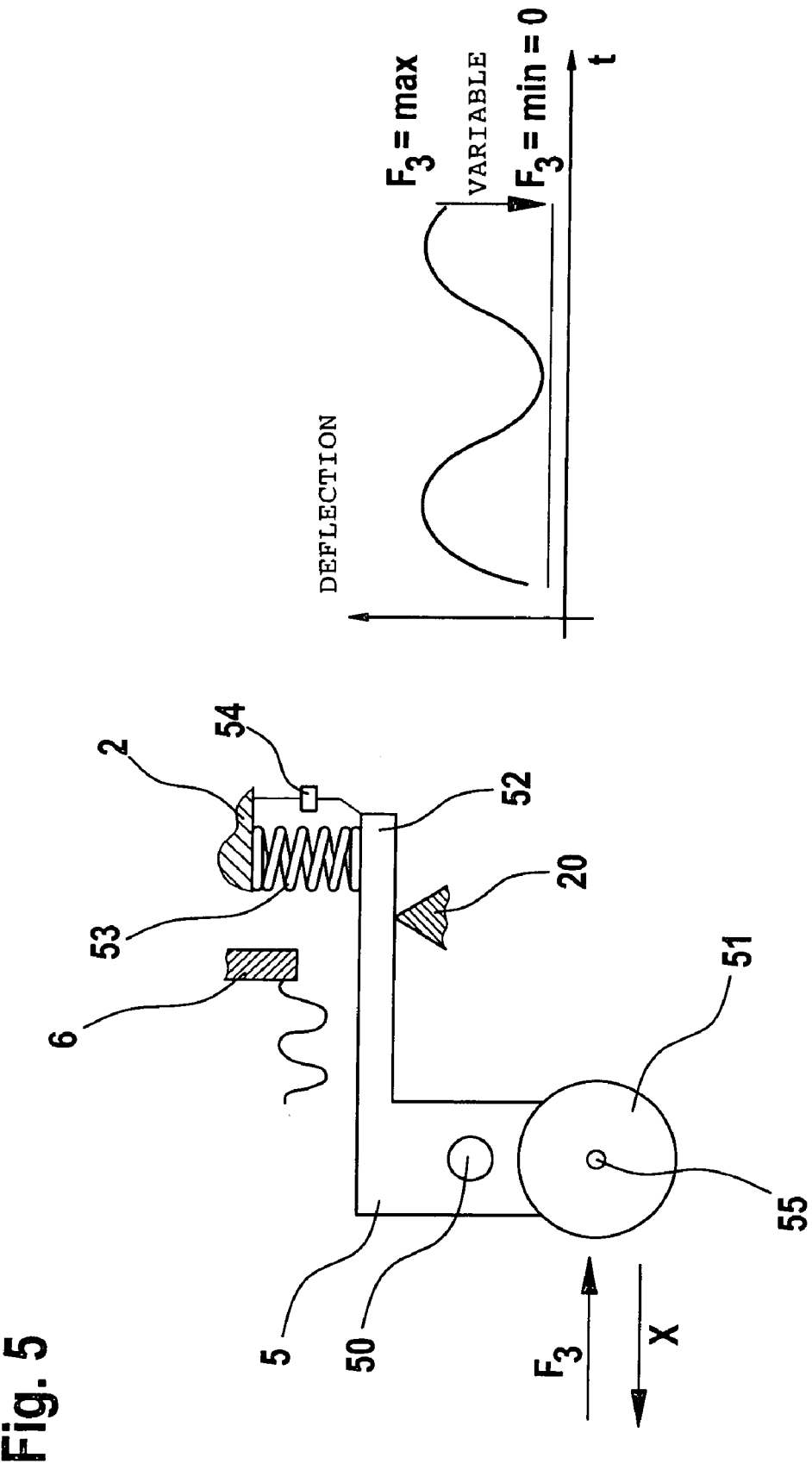
FIG. 5 shows a schematic design for an oscillation mechanism according to the present invention, with the curve of the deflection over time.

The sectional views in FIGS. 1 through 3 permit a thorough description to be given for a hand-guided, motor-driven compass saw machine 1. FIG. 4 shows the mechanism that has been used up to now for producing an oscillation and FIG. 5 shows a very simple embodiment form of the oscillation mechanism according to the present invention.

The compass saw machine 1 shown in FIG. 1 has a housing 2 in which a saw blade 3 reciprocates in the vertical direction. To that end, the saw blade 3 is secured in a lifter rod 4, which a motor sets into a vertical reciprocating motion in an intrinsically known fashion. Since the driving of the lifter rod 4 as well as its support and guidance are known in and of themselves and are not the subject of the present invention, they are not described in greater detail here. The compass saw machine 1 has an oscillation mechanism that imparts an oscillation, which is oriented lateral to the vertical reciprocating motion, to the lifter rod 4 with the saw blade 3. This results in a greater rate of material removal and therefore a faster forward saw progress when the compass saw machine 1 is moved in a working direction x. An oscillation mechanism of this kind is basically known. The discussion below begins with an oscillation mechanism according to the prior art (see FIG. 4) and then moves on to the oscillation mechanism according to the present invention (see FIG. 5).

The known oscillation mechanism has a two-armed roller lever 5 that is supported in the housing 2 so that it can rotate in seesaw fashion around a horizontal first axis 50. At the bottom end of the first lever arm, the roller lever 5 has a roller 51 that is supported so that it can rotate around a second horizontal axis 55. The second lever arm is bent at a 90-degree angle so that the end 52 oriented away from the roller extends horizontally. A compression spring 53 exerts a force that prestresses the upper lever arm down against a first stop 20 in the idle position of the roller lever 5.

If the compass saw machine 1 is moved in the working direction x in relation to a work piece so that an advancing force $F_3$ acts on the saw blade 3, the blade pushes the roller 51 and therefore the first lever arm of the roller lever 5 toward the rear. At the same time, compression springs 40 that exert a compressive spring force $F_2$ between the housing 2 and the lifter rod 4 (see FIG. 3) continuously press the saw blade 3 against the roller 51.

A projection 60 (FIG. 2) of a fork lever 6 rests against the end 52 of the roller lever 5 oriented away from the roller. By means of a cam, a drive motor (not shown) moves the fork lever 6 back and forth periodically, causing it to execute an up and down motion (see FIGS. 2 and 4). As a result, the end 52 of the roller lever 5 oriented away from the roller is deflected periodically up and down (see the deflection curve over time in FIG. 4). This means that when the projection 60 of the Fork lever 6 pushes the roller lever 5 down, this presses the roller 51 in the working direction x counter to the advancing force $F_3$ so that the saw blade 3 executes a rapid forward saw progress.

But since a powerful oscillation for a rapid forward saw progress has the disadvantage of a lower cutting quality, it is only suitable for sawing straight segments and should not be used for filigree work or sharply bending cutting curves. A second stop 21 (see FIGS. 2 and 4) is provided for this purpose.

The distance of this second stop from the idle position of the end 52 of the roller lever 5 oriented away from the roller limits the maximum upward deflection of the end 52 of the roller lever 5 oriented away from the roller and limits the oscillation stroke of the saw blade 3. With such a stroke limitation of the roller lever 5, the constant deflection stroke of the projection 60 of the fork lever 6 remains greater than that of the roller lever 5 and only a slower forward saw progress occurs as the maximum.

An adjusting knob makes it possible to manually set the second stop 21 from the outside to different distances from the end 52 of the roller lever 5 oriented away from the roller. The left part of FIG. 4 shows three sample settings ($P_0$, $P_I$, $P_{III}$) at different distances from the end 52 of the roller lever 5 oriented away from the roller. In order to simplify the depiction, these positions are shown next to one another. Depending on the mechanical design of the second stop 21, however, these settings are either all disposed one above the other or are disposed next to one another in a very limited horizontal range. The right part of FIG. 4 shows the effects that the four positions ($P_0$ through $P_{III}$) of the second stop 21 have on the curve over time of the deflection of the end 52 of the roller lever 5 oriented away from the roller. At the lowest setting $P_0$, no oscillation at all occurs, whereas at the highest setting $P_{III}$, the full oscillation is possible, which manifests itself in the form of a sinusoidal curve in the depiction of the deflection over time. At the intermediate settings $P_I$, $P_{II}$, the maxima of the deflection are each cut off vertically at the height at which the second stop 21 is located in the respective position $P_I$, $P_{II}$ above the end 52 of the roller lever 5 oriented away from the roller when the roller lever 5 is in its neutral position.

In an oscillating mechanism according to the present invention according to FIG. 5, the movement of the roller lever 5 likewise occurs in a known fashion via the fork lever 6. The deflection by means of the advancing force $F_3$ occurs in the same manner as in the known oscillation mechanism. Underneath the end 52 of the roller lever 5 oriented away from the roller, a first stop 20 is provided on the housing 2 (see FIGS. 1 and 5). Also in the region of the end 52 of the roller lever 5 oriented away from the roller, a spring element in the form of a spring 53 is provided between the housing 2 and the roller lever 5 and exerts a spring force $F_1$ between them. The spring 53 acts on the roller lever 5 in the same direction as the fork lever 6. Between the housing 2 and the end 52 of the roller lever 5 oriented away from the roller, a damping device 54 is also provided for damping the oscillation of the roller lever 5. The spring force $F_1$ of the spring 53 is greater than the compressive spring force $F_2$ of the compression springs 40 (see FIG. 3).

As long as the advancing force $F_3$ is weaker than the difference of the spring force $F_1$ and the compressive spring force $F_2$, the spring 53 constantly presses the end 52 oriented away from the roller against the first stop 20. As a result, no oscillation occurs. This corresponds to the known oscillating mechanism (see FIG. 4) in position $P_0$ of the second stop 21. If the advancing force $F_3$ is slowly increased, then the spring 53 is compressed and the projection 60 of the fork lever 6 imparts a periodic up and down motion to the end 52 of the roller lever 5 oriented away from the roller. The spring 53 exerts a force that presses the end 52 of the roller lever 5 oriented away from the roller down against the first stop 20. This results in a slow forward saw progress. But as the advancing force $F_3$ increases, the deflection of the end 52 of the roller lever 5 oriented away from the roller increases in opposition to the spring force $F_1$ of the spring 53. This results in an ever greater forward saw progress within the limits of the presettable maximum oscillation stroke. If the advancing force $F_3$ exceeds a predetermined value for the difference between the spring force $F_1$ of the spring 53 and the compressive spring force $F_2$ of the compression springs 40, then the maximum deflection of the roller lever 5 occurs, which corresponds to the oscillation stage $P_{III}$ of the second stop 21 (see FIG. 4).

The above-described oscillation mechanism according to the present invention has the advantage over the prior art that it automatically adjusts itself adaptively to the circumstances of the forward saw progress currently required. During a straight cut, the compass saw machine 1 is moved at a high speed in the working direction x so that a high advancing force $F_3$ is produced. This means (see above) that a more powerful pressure is exerted on the saw blade and therefore a greater degree of oscillation occurs, thus achieving a particularly rapid forward saw progress. By contrast, when sawing sharply curved or filigreed contours, only an extremely low advancing force $F_3$ is achieved since the compass saw machine 1 is only moved at a very low speed in the working direction x. If the advancing force $F_3$ is less than difference between the spring force $F_1$ of the spring 53 and the compressive spring force $F_2$ of the compression springs 40, then no oscillation of the saw blade occurs at all, which results in a slow forward saw progress and a very high degree of cutting precision.

The oscillation mechanism according to the present invention can be combined with a second stop 21 described above (see FIGS. 2 and 4) so that in any case, even with a powerful advancing force $F_3$, a presettable maximum oscillation occurs, with a maximum forward saw progress.

What is claimed is:

1. A motor-driven compass saw machine (1), having a housing (2) that contains a longitudinally moving lifter rod (4), which supports a saw blade (3), and an oscillation mechanism that is able to impart a variable oscillation stroke, which is oriented lateral to the longitudinal motion, to the saw blade (3), wherein the oscillation mechanism includes means for automatically adjusting the oscillation stroke smoothly between the maximum and minimum stroke during the sawing process, as an automatic response to a function of the pressure of the saw blade (3) against a work piece to be sawn, and a roller lever (5) which is disposed in the housing (2) and supports a roller (51) that remains in contact with the saw blade (3); and wherein said means for automatically adjusting the oscillation stroke comprises a spring element (53) which acts on said roller lever (5) such that said spring element (53) is compressed further as the pressure of the saw blade against a work piece to be sawn increases and a larger oscillation is produced.

2. The compass saw machine as recited in claim 1, whose oscillation mechanism the roller lever (5) can rotate around a horizontal first axis (50) and the roller (51) can rotate around a horizontal second axis (55), and whose oscillation mechanism has a fork lever (6) that periodically deflects the roller lever (5).

3. The compass saw machine as recited in claims 2, wherein the spring element (53) is disposed between the housing (2) and the end (52) of the roller lever (5) oriented away from the roller and cooperates with a component parallel to the deflection direction of the fork lever (6).

4. The compass saw machine as recited in claim 3, wherein parallel to the spring element (53), a damping device (54) is disposed between the housing (2) and the end (52) of the roller lever (5) oriented away from the roller.

5. The compass saw machine as recited in claim 2, wherein underneath the roller lever (5), in the region of its end (52) oriented away from the roller, a first stop (20) is provided on the housing (2).

6. The compass saw machine as recited in claim 2, wherein above the roller lever (5), in the region of its end (52) oriented away from the roller, a second stop (21) is provided on the housing (2).

7. The compass saw machine as recited in claim 6, wherein the second stop (21) can be set to various distances from the roller lever (5).

8. The compass saw machine as recited in claim 7, wherein the second stop (21) can be manually set to discrete distances from the roller lever (5).

9. The compass saw machine as recited in claim 3, wherein the saw blade (3) is pressed against the roller (51) by a compression spring (30) whose compression spring force ($F_2$) is weaker than a spring force ($F_1$) of the spring element (53).

10. The compass saw machine as recited in claim 9, wherein a deflection of the roller lever (5) only occurs if an advancing force ($F_3$) of the compass saw machine (1) is greater than the difference between the spring force ($F_1$) and the compression spring force ($F_2$).

* * * * *